May 9, 1961 W. R. MERCER 2,983,814
SIGNAL RECEIVERS
Filed Feb. 1, 1956
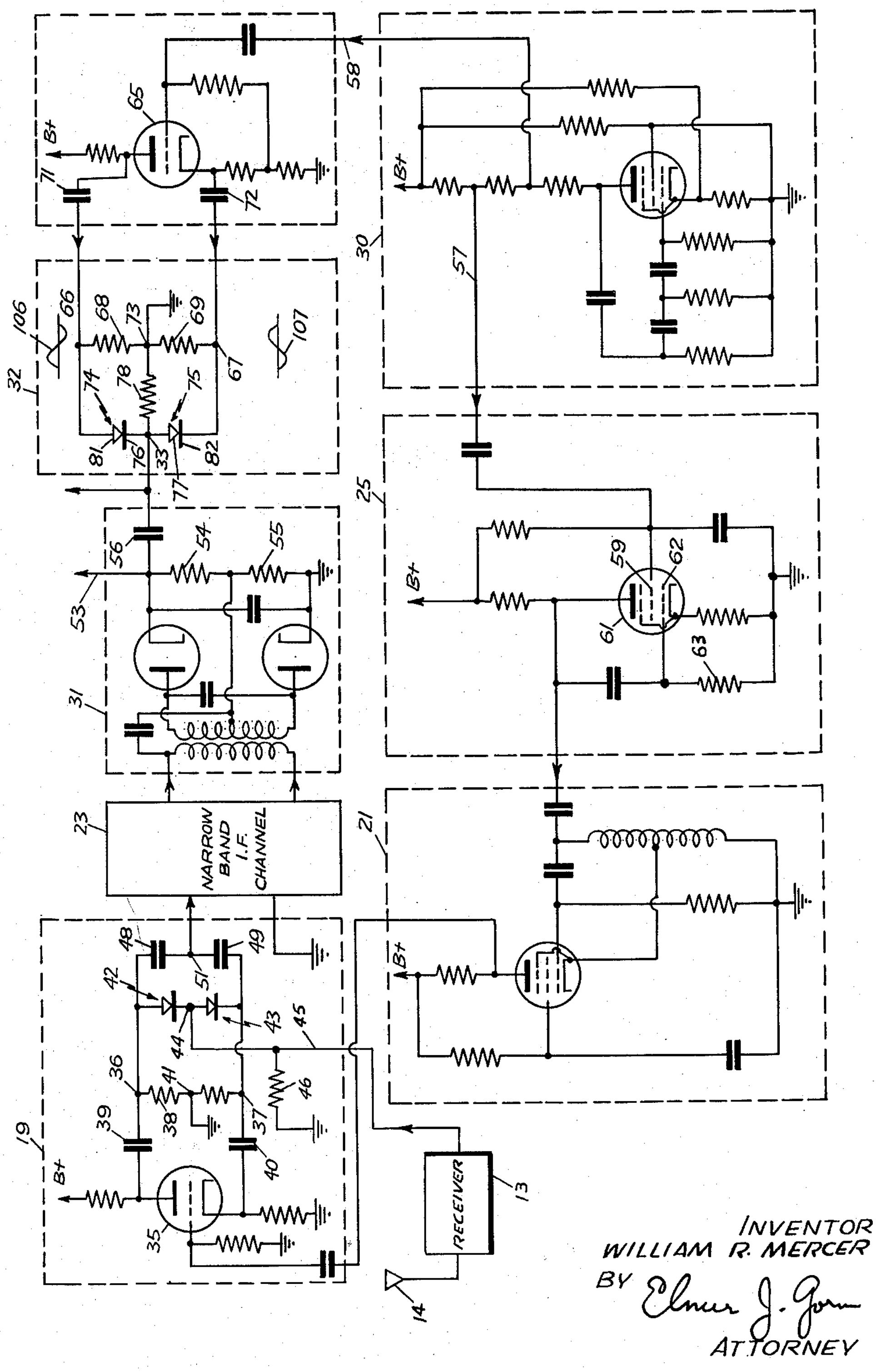
INVENTOR
WILLIAM R. MERCER
BY Elmer J. Gorn
ATTORNEY

United States Patent Office 2,983,814

Patented May 9, 1961

2,983,814

SIGNAL RECEIVERS

William R. Mercer, Belmont, Mass., assignor to Raytheon Company, a corporation of Delaware Filed Feb. 1, 1956, Ser. No. 562,682

7 Claims. (Cl. 250—20)

This is a continuation-in-part of an application, Serial No. 232,603, filed June 20, 1951 of William R. Mercer, now abandoned.

The present invention relates to electronic signal-acquisition apparatus, and more particularly to such apparatus which is able to discriminate a signal from a noise background, regardless of their relative energy levels.

Signal receivers exist which include a spectrum analyzer, through which a radio-frequency spectrum is scanned in a "panoramic" fashion, and present the information acquired on the face of a cathode ray tube. Information which is so presented enables an operator to discriminate a true signal from a noise background.

However, this system requires a cathode ray tube and an observer who is capable of exercising skilled judgment. The problem of discriminating a low-energy signal from a noise background is common in other electronic applications, however, including those involving automatic equipment which cannot bring the flexibilities of human intelligence into the process of signal detection. The present invention is directed particularly to such apparatus, and provides means for the coding and detecting of such a low-energy signal in a manner which discriminates against noises, particularly locally-generated noises such as microphonics, and so utilizes the coherence properties of a true signal that it affords particularly-effective discrimination against so-called "random" noise.

"Random" noise is characterized by its lack of a phase spectrum, although it may have a definite power spectrum on the average. Thus, if a narrow band of random noise is selected as by some form of wave analyzer from a much broader band of random noise, only its amplitude will depend upon the portion of the broad band selected. In particular, if the narrow-band portion selected is varied with time, amplitude modulation will result. In addition, an amplifier passing the random noise may have time-varying gain, and this may cause the random noise to exhibit amplitude modulation. On the other hand, whether a fixed or time-varying portion of the original broad band of noise is selected, the phase spectrum of any given narrow-band portion remains equally random, that is, nonexistent on the average. This randomness of phase cannot be removed in general by any specified time-varying transmission phase characteristic. Therefore, in contrast to random noise, a true signal exhibits definite coherence of its phase. It is this property which enables an operator observing "panoramic" information on the face of a cathode ray tube to discriminate a true signal from a noise background of comparable, or even greater intensity.

The present invention is, therefore, directed to apparatus which automatically employs the coherence properties of a desired signal, and the incoherence properties of random noise, to effect by phase modulation or frequency modulation a coding of only the former from a mixture of the two, and the subsequent use of frequency modulation or phase modulation detection to recover this coding in order to obtain an optimum signal-to-noise ratio after this detection, and the latter is obtained for both nonrandom and random noise. Accordingly, the invention envisions a signal receiver which may be of any known form, having in addition a coding oscillator which, through proper control circuits, frequency- or phase-modulates the energy present at some stage in the receiver. Subsequently, the frequency-modulated energy is demodulated to yield a signal at the modulation frequency which is then compared in phase with original modulating energy. By these means, the phase consistency or coherence property of a true signal is immediately made apparent, for a true signal can be frequency modulated, while random noise which accompanies the same cannot. In addition, nonrandom noise originating in the portions of the receiver following the stage at which the frequency modulation in accordance with the invention was introduced, is not frequency modulated, and therefore this, too, is discriminated from the true signal.

The foregoing and additional features of the invention will become apparent from a detailed description of an embodiment thereof which follows. This description refers to the accompanying drawing, wherein:

The drawing is a circuit diagram constructed in accordance with the invention.

In the signal receiving system illustrated in the drawing, a receiver 13, comprising a conventional antenna 14 and a broad band signal amplifying channel, is tuned so that it will receive the band of energy which is to be examined. The output of the broad band channel of the receiver 13 is mixed by a modulator or mixer 19 with the signal of a reference oscillator 21 which is normally swept in frequency by a coding oscillator 30 through the medium of a reactance modulator 25. Specifically, the invention herein disclosed and claimed is embodied in a combination of electrical components including a resistor 78 across whose terminals is developed the output code information in the form of the presence or absence of an output voltage; the presence of a voltage indicating the presence of a true signal in the energy entering receiver 13, and the absence of a voltage indicating that noise only is being received. Thus, as noted, coding oscillator 30 delivers its output directly to reactance modulator 25 and thereby causes frequency modulation of the signal output of reference oscillator 21. The basic circuitry for performing this function, as shown in the drawing, includes the above-described reactance modulator 25 whose grid circuit 59 receives the output of coding oscillator 30 and whose plate circuit delivers the frequency modulated energy to the reference oscillator 21. As a result, the signal from the broad band channel of receiver 13 which is presented to the mixer 19 is frequency modulated, and the I.F. signal which appears in the narrow-band I.F. channel 23 carries the same frequency modulation. The output of the narrow-band I.F. channel is then fed to a discriminator 31 which may be the existing discriminator of a frequency-modulation receiver system. Of course, the discriminator may already exist in the receiver and may be employed for the present purpose. A phase comparator 32 is provided with the detected modulation envelope through the discriminator 31 with an original modulating wave from the coding oscillator 30. Here, these two waves are compared in phase, and code information is provided via an output line connected to junction 33.

If the information present in the narrow-band I.F. channel 23 contains a true signal, this signal will be frequency modulated in accordance with the modulation of the reference oscillator 21, and the modulation will be recoverable in the discriminator 31. On the other hand, if merely random noise is present, it will not exhibit any different characteristic when the reference oscillator 21 is frequency modulated than in the absence of such frequency modulation, and hence no modulation envelope will be recoverable in the discriminator 31. In addition, if a modulation envelope is recovered, it will exhibit a definite phase relation with respect to the original modulating wave from the coding oscillator 30. The two inputs to the phase comparator may, therefore, be in phase, differ slightly in phase, or, by properly chosen circuit design, may be made to have any desired phase relation. The phase comparator will test for the desired phase relation as will presently appear.

Referring again to the drawing, the mixer 19 which is illustrated is one of simple design, having the characteristics of a balanced modulator, or mixer. The output of the reference oscillator 21, which will be recognized as one of the Hartley type, is provided to a phase inverter 35, from which two signals equal in amplitude but opposite in phase and balanced with respect to ground are furnished to the opposite ends 36 and 37 of a resistor 38 via capacitors 39 and 40, respectively. The capacitors 39 and 40 have substantially equal reactance at the reference oscillator frequency, which reactance is preferably equal to half the total resistance of the resistor 38. The resistor 38 is grounded at its center 41. A pair of diodes 42 and 43, which may be of dry-disk or contact type, are connected in series, similarly poled, across the resistor 38, and the signal from the broad-band channel of receiver 13 or other signal-producing means is introduced at their junction 44 via a signal input line 45. A resistor 46 is connected from the signal input line 45 to ground, and it is across this resistor that the input signal is developed. The output from the mixer is taken through a pair of capacitors 48 and 49 connected in series between the ends 36 and 37 of the resistor 38, which also have substantially equal reactance at the reference-oscillator frequency. The output signal appears between the junction 51 of the latter two capacitors 48 and 49 and ground. It is characteristic of this mixer that the reference-oscillator voltage will not appear in the output, but that voltage at the signal frequency, as well as sum and difference voltages of the reference-oscillator and signal frequencies, and sum and difference voltages of their harmonics will appear in the output and be presented to the narrow-band I.F. channel 23. The latter is tuned to accept only a suitable difference frequency and reject all others in accordance with well-known principles.

The discriminator 31 is of the well-known Foster-Seeley type, as is illustrated, for example, in United States Patent No. 2,121,103, where this discriminator is part of a frequency-modulation receiver. The detected output which, in accordance with the present invention, is substantially free from noise, is furnished via a suitable line 53 to succeeding stages of the receiver, and appears between this line and ground, or across the output resistors 54 and 55 which are connected in series.

It should be clearly understood that the system disclosed may be used without the phase comparator, in which case the output from the discriminator 31 at 53 would be a substantially sinusoidal signal of the frequency produced by coding oscillator 30 with the amplitude of the signal being determined by the amplitude of the true signal fed into a receiver 13 and with the noise components substantially cancelled out. This signal may be used for any desired purpose, such as energizing an indicator which indicates the presence or absence of a true signal. The use of the phase comparator 32, fed by the output of discriminator 31 and referenced to the coding oscillator 30, further reduces the noise content, with the output from the phase comparator appearing across resistor 78 as a D.C. signal which may be used to energize a relay to indicate the presence of a signal. Thus, in accordance with the present invention, an output signal is coupled from the discriminator 31 to the phase comparator 32 via a suitable coupling capacitor 56.

The coding oscillator 30 will be recognized as a sine-wave oscillator of the phase-shift type, and may oscillate at a frequency of, for example, seventy cycles per second. This oscillator has two output lines 57 and 58, the former of which is connected to the screen grid 59 of the tube 61 in the reactance-modulator circuit 25. The grid of sweep tube 61 is returned to ground through grid resistor 63. Through the reactance modulator 25, the reference oscillator 21 is controlled in frequency, in the present instance sinusoidally, in accordance with the output of the coding oscillator 30.

The coding-oscillator output voltage is connected also to a phase inverter 65 over the remaining output line 58. This phase inverter furnishes two signals at the coding-oscillator frequency of mutually opposite phase and balanced to ground to the opposite ends 66 and 67 of a pair of series-connected resistors 68 and 69 via suitable coupling capacitors 71 and 72, respectively.

The phase comparator 32 includes the aforementioned series-connected resistors 68 and 69, grounded at their common junction 73, and having first and second diodes 74 and 75, respectively, series-connected between the ends 66 and 67. The diodes 74 and 75 are similarly poled, and may be of any suitable type, for example, the dry-disk or contact type, although vacuum-tube diodes are also suitable. They should, however, have similar resistance characteristics in each direction. The anode 76 of the first diode 74 and the cathode 77 of the second diode 75 are connected together, and their junction 33 is the output for the code information. A third resistor 78, which is the element across which the output code information is developed, is connected between the junction 33 of the diodes and the junction 73 of the first and second resistors 68 and 69.

In the absence of an output from the discriminator 31 via the coupling capacitor 56, the coding-oscillator waves appearing in opposite phase at the ends 66 and 67 of the resistors 68 and 69 will cause mutually-opposite currents to tend to flow in the output resistor 78, which currents will balance each other if the first and second resistors 68 and 69 are equal, and if the diodes have similar resistance characteristics in the forward direction and in the reverse direction. This is apparent from the fact that, if the anode 81 of the first diode 74 is made positive with respect to ground, the cathode 82 of the second diode 75 is simultaneously made negative to the same extent with respect to ground. Thus, while current will tend to flow from point 33 to point 73 through the output resistor 78 when the first diode becomes conductive, a current of similar magnitude will tend to flow from point 73 to point 33 through the same output resistor 78 when the second diode 75 simultaneously becomes conductive. Accordingly, no output code-information signal appears at the output point 33 in the absence of a suitable signal from the discriminator 31.

If a true signal is present in the mixer 19, then, as has been previously set forth, the modulation envelope will be recovered in the discriminator 31, and this modulation envelope will be applied across the output resistor 78 of the phase comparator via the coupling capacitor 56. The voltage wave thus applied will be one of the same form and frequency as the output of the coding oscillator 30. Further, a definite phase relation will exist between the modulation envelope as received from the discriminator 31 and the voltage waves received from the phase inverter 65, as these waves all arrive at the phase comparator 32. This phase relation can be made to have any desired value, and in the present instance it will be assumed that the modulation envelope is in phase with the wave 106 at point 66, and in phase opposition with the wave 107 at point 67 of the phase comparator 32. Thus, during the half cycle when the anode 81 of the first diode 74 is positive, the cathode 76 is likewise positive, and, with the relative amplitudes suitably adjusted, no current flows through the first diode 74. During the same half cycle when the cathode 82 of the second diode 75 is made negative, the anode 77 thereof is made positive, and current does flow through the second diode 75 and from point 73 to point 33 in the output resistor 78. During the succeeding half cycle, neither of the two diodes 74 and 75 becomes conductive in the presence or absence of a signal from the discriminator 31. Therefore, when the signals are phased, as has been assumed herein, the presence of a suitable signal from the discriminator 31 causes a unidirectional current to flow in the output resistor 78 and hence a unidirectional voltage to appear across this resistor. This voltage is the code information. Obviously, this voltage can be given any desired polarity. It is equally obvious that the magnitudes of the various voltages applied to the phase comparator 32 can be adjusted to be equal. Likewise, the resistors 68 and 69 in the phase comparator 32 can be given different relative values, so that, if desired, the existence of a true signal will reduce a pre-existing voltage in the output resistor 78, or enhance the same and, as noted, can be used to actuate external electronic apparatus. Such modifications will occur to those skilled in the art.

In addition, the coding oscillator need not oscillate in sinusoidal fashion, but may provide a wave having any desired characteristic. Thus, pulses may be provided, in which case the reference oscillator 21 would be frequency modulated pulse fashion, and the modulation envelope received from the discriminator 31 would reproduce the pulse wave of the coding oscillator.

Other and further modifications within the spirit and scope of the invention will occur to those skilled in the art, and many other embodiments thereof can be constructed without the exercise of further invention. No attempt is made herein to exhaust all possibilities. It is accordingly intended that the claims which follow shall not be limited by the particular details of either of the embodiments or the suggested circuit which are illustrated herein, but only by the prior art. The term "frequency modulation" is intended to include "phase modulation."

What is claimed is:

1. A signal detecting system comprising a receiver adapted to amplify a first unmodulated signal source, a mixer fed from said source, a second source of signals cyclically variable in frequency feeding said mixer to produce a frequency modulated coded signal, a balanced frequency discriminator fed by signals derived from said mixer, and a phase comparator to recover said coded signal fed by the output of said discriminator and referenced to the modulation rate of said second source of signals.

2. A signal detecting system comprising a signal source, a narrow band tuned signal channel, symmetrical frequency discriminating signal rectifying means capable of noise cancellation fed by said tuned channel, and means for cyclically varying the effective resonant frequency of the tuned channel relative to the frequency of signals from said source by an amount less than the width of said tuned channel to transmit symmetrical sidebands of said signals.

3. A signal detecting system comprising a first signal source, a coding oscillator, a balanced mixer fed from said source, a second source of signals cyclically variable in frequency in response to the output of said coding oscillator feeding said mixer to produce sidebands, a balanced frequency discriminator directly fed by signals derived from said mixer to recover said sidebands, and a phase comparator fed by sideband signals from said discriminator and by a reference voltage derived from said coding oscillator to produce an output voltage in response to a coherent signal.

4. A signal detecting system comprising a receiver adapted to amplify unmodulated signals including a narrow band tuned signal channel, a frequency discriminating signal rectifying means fed by said tuned channel, and means for cyclically varying the effective resonant frequency of the tuned channel relative to the frequency of said unmodulated signals over a band of frequencies narrower than said tuned channel.

5. A signal detecting system comprising a first signal source, a mixer fed from said source, a second source of signals cyclically variable in frequency feeding said mixer, a balanced frequency discriminator fed by signals derived from said mixer, and a phase comparator fed by the output of said discriminator and referenced to the modulation rate of said second source of signals whereby a direct current output current is produced in response to a coherent signal in said phase comparator.

6. A detecting system comprising a receiver adapted to amplify a source of unmodulated signals, a balanced mixer fed by said source of signals, a reference oscillator feeding said balanced mixer to mix the signals from said unmodulated source, means including a coding oscillator for cyclically varying the frequency of said reference oscillator to produce sideband signals, a bandpass amplifier fed by the output of said mixer, and a balanced frequency discriminator fed by said amplifier, said discriminator having an output frequency response including the frequency at which said reference oscillator is cyclically varied in frequency in response to said coding oscillator, and a phase comparator fed by the output of said discriminator and the output of said coding oscillator to recover said sideband signals in the presence of noise.

7. A detecting system comprising a receiver adapted to amplify a source of unmodulated signals, a balanced mixer fed by said source of signals, a reference oscillator feeding said balanced mixer to mix the signals from said receiver, coding oscillator means for cyclically varying the frequency of said reference oscillator, a bandpass amplifier energized by the output of said mixer, a balanced frequency discriminator fed by said amplifier, said discriminator having an output frequency response including the frequency at which said reference oscillator is varied in frequency, and a phase comparator fed by the output of said discriminator and the output of said coding oscillator means.

References Cited in the file of this patent

UNITED STATES PATENTS

| | | |
|---|---|---|
| 2,131,109 | Lowell | Sept. 27, 1936 |
| 2,134,850 | Baesecke | Nov. 1, 1938 |
| 2,244,799 | Paddle | June 10, 1941 |
| 2,259,000 | Nyquist | Oct. 14, 1941 |
| 2,398,793 | Magnuski | Apr. 23, 1946 |
| 2,428,265 | Crosby | Sept. 30, 1947 |
| 2,469,222 | Atwood et al. | May 3, 1949 |
| 2,509,337 | Earp | May 30, 1950 |
| 2,773,191 | Watkins | Dec. 4, 1956 |
| 2,809,289 | Harris | Oct. 8, 1957 |
| 2,853,601 | McKenna et al. | Sept. 23, 19558 |

FOREIGN PATENTS

| | | |
|---|---|---|
| 907,665 | Germany | Apr. 10, 1941 |
| 528,061 | Great Britain | Oct. 22, 1940 |